May 22, 1945.   F. V. HENDRICK   2,376,484
AGRICULTURAL VEHICLE SEAT
Filed Oct. 5, 1944
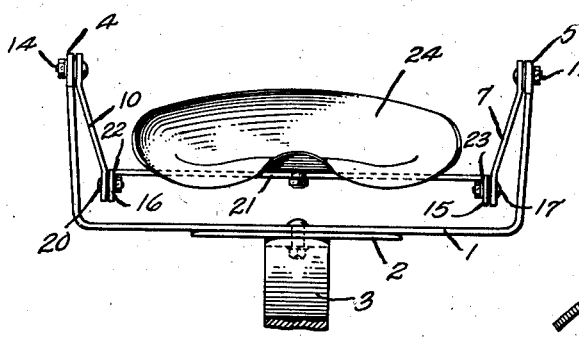
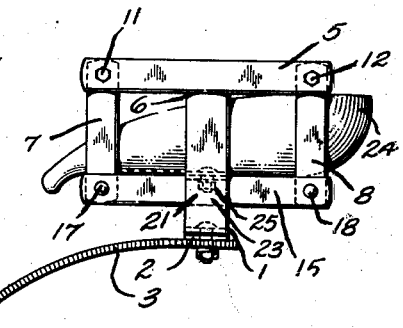
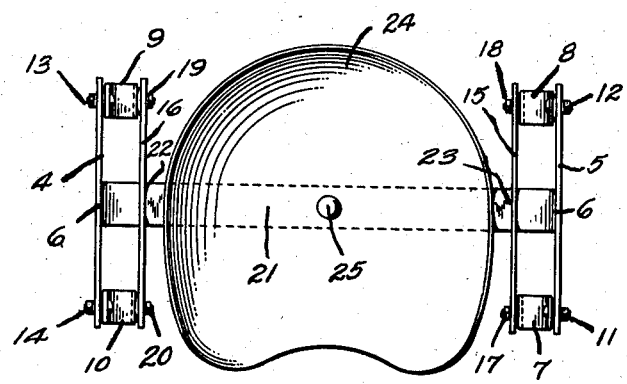
INVENTOR.
FRED V. HENDRICK
BY
ATTORNEY Patented May 22, 1945

2,376,484

UNITED STATES PATENT OFFICE 2,376,484

AGRICULTURAL VEHICLE SEAT

Fred V. Hendrick, Princeville, Ill.

Application October 5, 1944, Serial No. 557,262

1 Claim. (Cl. 155—51)

This invention resides in the provision of a swinging hammock seat for agricultural vehicles, such as plows, cultivators, tractors and the like.

The primary object of my invention is to provide a simply constructed, comparatively inexpensive seat, which may be readily and easily attached to agricultural vehicles, particularly tractors, and prove exceptionally strong and comfortable. In addition, and primarily, this seat will arrest bounce and vibration caused by the vehicle travelling over uneven ground.

With the above-mentioned and other objects in view, the invention consists in the novel construction and combination of parts hereinafter described, illustrated in the accompanying drawing, and set forth in the claim hereto appended, it being understood that various changes in the form, preparation, size and minor details of construction within the scope of the claim may be resorted to without departing from the spirit or sacrificing any of the advantages of the invention.

Referring to the drawing:

Fig. 1 represents a front elevation of a seat constructed in accordance with my invention.

Fig. 2 is a side elevation of the seat of my invention.

Fig. 3 is a top plan view of the seat of my invention.

The embodiment of the invention illustrated in the accompanying drawing includes a U-shaped stationary frame 1, and an attached plate or bar 2, adapted to secure the stationary frame to the tractor seat support 3.

The upper ends of the stationary frame are rigidly secured to the center of horizontal bars 4 and 5 at 6.

Angularly bent rods 7, 8, 9 and 10 are bolted at their upper terminals to said horizontal bars at 11, 12, 13 and 14, and at their lower terminals to horizontal bars 15, and 16, at 17, 18, 19, and 20.

Horizontal suspension cross piece 21 is rigidly secured to the center of horizontal bars 15 and 16 at 22 and 23.

The seat 24 is bolted to the said horizontal suspension cross piece at 25.

This construction permits the seat to swing freely, arresting bouncing and vibration.

Having thus disclosed the invention, I claim:

A vehicle hammock seat comprising an attaching plate adapted to be secured to a vehicle to which the seat is to be attached, a U-shaped stationary frame secured to said attaching plate, horizontal bars rigidly secured to the upper ends of said stationary frame, angularly bent rods bolted at their upper terminals to the ends of said horizontal bars, horizontal bars bolted at their ends to the lower terminals of said angularly bent rods, a horizontal suspension cross piece rigidly secured to the center of said lower horizontal bars, a seat member suspended upon said horizontal suspension cross piece.

FRED V. HENDRICK.